US008928262B2

(12) United States Patent
Chretien

(10) Patent No.: US 8,928,262 B2
(45) Date of Patent: Jan. 6, 2015

(54) METHODS AND SYSTEMS FOR CONTROLLING AN ELECTRIC MOTOR

(71) Applicant: Regal Beloit America, Inc., Beloit, WI (US)

(72) Inventor: Ludovic Andre Chretien, Columbia City, IN (US)

(73) Assignee: Regal Beloit America, Inc., Beloit, WI (US)

( * ) Notice: Subject to any disclaimer, the term of this patent is extended or adjusted under 35 U.S.C. 154(b) by 114 days.

(21) Appl. No.: 13/826,043

(22) Filed: Mar. 14, 2013

(65) Prior Publication Data
US 2014/0265956 A1 Sep. 18, 2014

(51) Int. Cl.
*H02P 6/12* (2006.01)
*H02P 23/14* (2006.01)

(52) U.S. Cl.
CPC .................................. *H02P 23/14* (2013.01)
USPC .................. 318/400.15; 318/400.01; 318/700

(58) Field of Classification Search
CPC ........................................................ H02P 6/06
USPC ................. 318/400.15, 400.01, 700
See application file for complete search history.

(56) References Cited

U.S. PATENT DOCUMENTS

| 4,761,600 | A | 8/1988 | D'Atre et al. |
| 5,818,194 | A | 10/1998 | Nordby |
| 6,215,261 | B1 | 4/2001 | Becerra |
| 6,768,284 | B2 | 7/2004 | Lee et al. |
| 6,828,746 | B2 | 12/2004 | Kumar |
| 7,095,208 | B2 | 8/2006 | Kawaji et al. |
| 7,332,884 | B2 * | 2/2008 | Rozman et al. ............... 318/432 |
| 7,557,543 | B2 | 7/2009 | Prakash et al. |
| 7,650,760 | B2 | 1/2010 | Nakata et al. |
| 7,670,253 | B2 | 3/2010 | Sah |
| 7,739,016 | B2 | 6/2010 | Morris |
| 7,865,287 | B2 | 1/2011 | Huseman |
| 7,908,064 | B2 | 3/2011 | Cawthorne et al. |
| 7,977,896 | B2 | 7/2011 | Heap et al. |
| 7,987,934 | B2 | 8/2011 | Huseman |
| 7,990,092 | B2 | 8/2011 | Woodward |
| 8,010,263 | B2 | 8/2011 | Morris |
| 8,049,459 | B2 | 11/2011 | Woodward |
| 8,050,821 | B2 | 11/2011 | Morris et al. |
| 8,140,230 | B2 | 3/2012 | Haggerty et al. |
| 8,195,352 | B2 | 6/2012 | Morris |

FOREIGN PATENT DOCUMENTS

| EP | 1429450 B1 | 2/2008 |
| EP | 1843463 B1 | 7/2013 |
| JP | 4416486 B2 | 2/2012 |
| KR | 101006589 B1 | 1/2011 |

* cited by examiner

Primary Examiner — David S Luo
(74) Attorney, Agent, or Firm — Armstrong Teasdale LLP

(57) ABSTRACT

A system and method of controlling an electric motor using a motor controller are provided. The system includes an electric motor controller configured to be coupled to an electric motor and to control the electric motor to produce approximately constant average torque. The controller includes a rectifier configured to convert an AC input voltage to a pulsing DC voltage, a DC link electrically coupled to the rectifier, an inverter electrically coupled to the DC link and configured to generate a three phase AC voltage to drive the electric motor, and a controller configured to receive a measurement of a motor current value for the motor, estimate a torque generated in the electric motor using the measurement of the instantaneous motor current value, and generate a real-time current demand signal using the estimated torque value, the real-time current demand signal compensating the motor controller to produce a substantially constant average motor output torque.

20 Claims, 9 Drawing Sheets

METHODS AND SYSTEMS FOR CONTROLLING AN ELECTRIC MOTOR

BACKGROUND OF THE DISCLOSURE

The field of the invention relates generally to electric motors, and more specifically, to methods and systems for operating electric motors.

Typical electric motor systems include a motor controller and an electric motor. The motor controller receives power from an alternating current (AC) power supply, and applies it to a rectifier and to capacitors to generate a smoothed direct current (DC) voltage. The motor controller then supplies a chopped DC voltage to the electric motor through an inverter, which uses the power to drive a load.

Capacitors typically used in motor controllers include electrolytic capacitors with high capacitances (about several hundreds µF). The high capacitances cause the capacitors of the motor controller to be bulky and expensive. These capacitors necessitate a larger motor controller and may reduce the lifespan of the motor controller. New drive technologies target having substantially reduced capacitance capacitors to reduce the size and expense of the electrolytic capacitors. As the energy storage elements (capacitors) have been reduced in the motor drives, the motor phase current may not reach typical steady state waveforms and torque production has a ripple component that varies in amplitude as a function of the motor load point and the input voltage to the system. Typical control algorithms regulating steady state motor currents cannot deliver constant average torque performance. As the torque production is varying as a function of the input source frequency, the motor speed is constantly varying.

BRIEF DESCRIPTION OF THE DISCLOSURE

In one embodiment, an electric motor controller is configured to be coupled to an electric motor and to control the electric motor to produce approximately constant average torque. The controller includes a rectifier configured to convert an AC input voltage to a pulsing DC voltage, a DC link electrically coupled to the rectifier, an inverter electrically coupled to the DC link and configured to generate a three phase AC voltage to drive the electric motor, and a controller configured to receive a measurement of instantaneous motor current values for the motor, estimate a torque generated in the electric motor using the received measurement of the instantaneous motor current values, and generate a real-time current demand signal using the estimated torque value, the real-time current demand signal compensating the motor controller to produce a substantially constant average motor output torque over a wide speed range.

In another embodiment, a method of controlling an electric motor configured to be coupled to a power supply and to a load using a motor controller includes receiving a measurement of instantaneous motor current values for the motor, estimating a torque generated in the electric motor using the received measurement of the instantaneous motor current values, and generating a real-time current demand signal using the estimated torque value, the real-time current demand signal compensating the motor controller to produce a substantially constant average motor output torque over a wide speed range.

In yet another embodiment, an air moving system includes an electric motor, a load coupled to the electric motor, and a controller coupled to the electric motor, the controller configured to receive a measurement of instantaneous motor current values for the motor, estimate a torque generated in the electric motor using the received measurement of the instantaneous motor current values, and generate a real-time current demand signal using the estimated torque value, the real-time current demand signal compensating the motor controller to produce a substantially constant average motor output torque over a wide speed range.

BRIEF DESCRIPTION OF THE DRAWINGS

FIG. 1 is a functional diagram of a motor drive that may be used for operating an electric motor.

FIG. 2 is a graph of a torque/speed curve for a motor assembly in accordance with an exemplary embodiment of the present disclosure.

FIG. 3 illustrates that a typical control algorithm cannot regulate steady state torque in a low capacitance motor as in other drives associated with typical ECMs.

FIG. 4 is a graph of a natural torque profile of a low capacitance drive using typical motor control algorithm in the controlled motor.

FIG. 5 is a block diagram of an exemplary algorithm implemented by the controller shown in FIG. 1.

FIG. 6 is a block diagram of another exemplary algorithm implemented by the controller shown in FIG. 1 to maintain a constant average torque output over a wide speed range of the electric motor also shown in FIG. 1.

FIG. 7 is a graph of the natural torque profile (squares) of a low capacitance drive-controlled motor as shown in FIG. 5 overlain with a torque profile (diamonds) of the low capacitance drive-controlled motor regulated using embodiments of the present invention.

FIG. 8 is a block diagram of an exemplary embodiment of the motor drive controller shown in FIG. 1 in an air moving control system.

FIG. 9 is a flow chart of a method of operating an electric motor, such as the electric motor shown in FIG. 1 using motor drive controller shown in FIG. 1.

Figure 1:
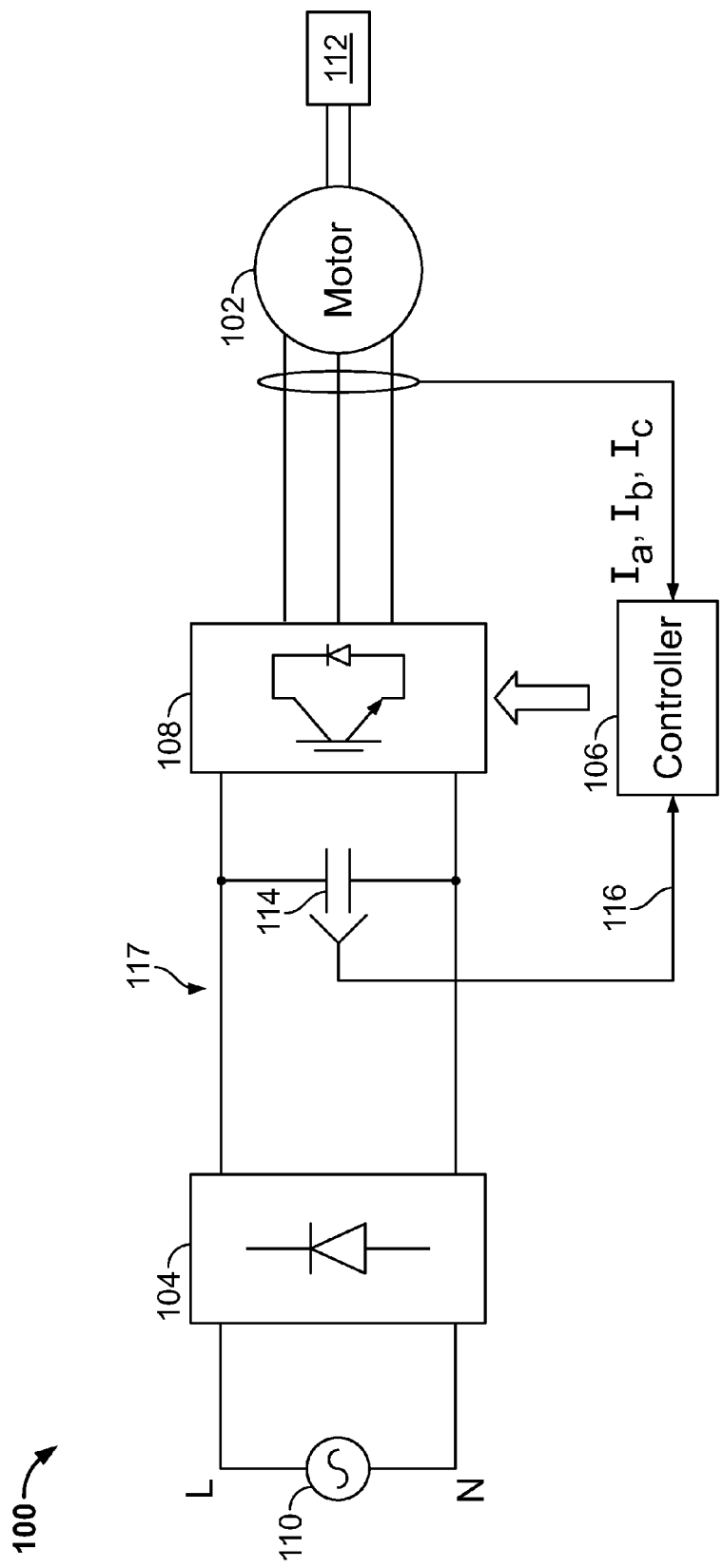
FIGS. 1-9 show exemplary embodiments of the method and systems described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION OF THE DISCLOSURE

The following detailed description illustrates embodiments of the disclosure by way of example and not by way of limitation. It is contemplated that the disclosure has general application to operating electronically commutated motors.

Embodiments of the present disclosure relate to an improved system for controlling an electronically commutated motor (ECM). A typical drive with passive front end (i.e. without front end switching elements) comprises a bridge rectifier with large capacitors to rectify the AC voltage into a DC voltage. This DC voltage is then modulated by the inverter stage to provide three-phase voltages to the ECM.

The capacitor is sized so as to maintain DC voltage with low ripple when the ECM is operating. The control can be using a microcontroller monitoring machine currents to regulate the motor states (torque, speed).

In the case of the newly proposed drive system, the capacitor value is reduced to a minimum and the voltage across the capacitor therefore decreases to zero volts under load. The controller therefore needs to maximize the current (therefore torque, hence power) at the peak of the capacitor voltage as the torque production decreases when the voltage drops toward zero.

To achieve a maximum ECM efficiency, the ECM should produce maximum torque with the minimum amount of phase current so as to minimize the winding losses.

ECMs can have multiple modes of operation, for example, but not limited to, a constant torque mode, a constant speed mode, a constant airflow mode (built on torque and speed knowledge), a constant power mode (built on torque and speed knowledge), and user defined profiles (built on torque and speed knowledge). Some ECMs are calibrated to regulate a specified output torque and some applications require output torque to be insensitive to input voltage variations.

In field oriented control of permanent magnet machines, the torque is controlled in the d-q rotating frame by defining the trajectories of the d and q axis currents that are DC components in steady state operation. The envelope of the machine is achieved when the machine terminal voltages equal the available bus voltage. In low capacitance drives, the bus voltage may reach zero at twice the line frequency and the d and q axis currents cannot reach steady state. The proposed algorithms permit controlling the average torque production of the machine through real time adjustments to the transient d and/or q current trajectories. As used herein, low capacitance describes a motor controller with relatively little capacitance across the DC-link of the controller. Low capacitance may also refer to a motor controller with no capacitors installed across the DC-link of the controller, particularly electrolytic-type capacitors.

The following description refers to the accompanying drawings, in which, in the absence of a contrary representation, the same numbers in different drawings represent similar elements.

FIG. 1 is a functional diagram of a motor drive 100 that may be used for operating an electric motor 102. In the exemplary embodiment, motor drive controller 100 includes a rectifier 104, a controller 106, and an inverter 108. Motor drive controller 100 is coupled to a power supply 110 for receiving input power to drive electric motor 102. Electric motor 102 is coupled to and drives a load 112.

In the exemplary embodiment, power supply 110 supplies a single-phase alternating current (AC) voltage to motor drive controller 100. However, power supply 110 may supply three-phase AC, or any other type of input voltage that enables motor drive controller 100 to function as described herein. Rectifier 104 receives an AC input voltage from a power supply 110 and rectifies it to produce a pulsed DC voltage. Inverter 108 conditions the pulsed DC voltage, and supplies it to electric motor 102, which uses the power to drive load 112. In the exemplary embodiment, inverter 108 converts the pulsed DC voltage to a three-phase AC voltage. Alternatively, inverter 108 converts the pulsed DC voltage to any type of voltage that enables motor controller to function as described herein.

In some embodiments, motor drive controller 100 includes a low-capacitance capacitor 114 for storing small amounts of energy when input voltage is available. Capacitor 114 may have a capacitance between about 0.1 µF/kW and about 10 µF/kW. The use of bulky, unreliable electrolytic capacitors in motor drive controller 100 is avoided. In some embodiments, capacitor 114 is configured to filter out switching frequency harmonics of electric motor 102. In other embodiments, the low-capacitance of capacitor 114 reduces inrush input current to electric motor 102. Further, capacitor 114 facilitates motor drive controller 100 increasing line input power factor.

Motor drive controller 100 also includes a method of sensing DC link voltage, such as, but not limited to, through a voltage divider or a voltage sensor 116 coupled across capacitor 114. The method of voltage sensing is configured to measure a voltage of a DC link 117 downstream of rectifier 104. The method of voltage sensing provides the DC link voltage measurement to controller 106 for use in controlling electric motor 102 to produce torque when DC link voltage has a 100% voltage ripple.

Figure 2:
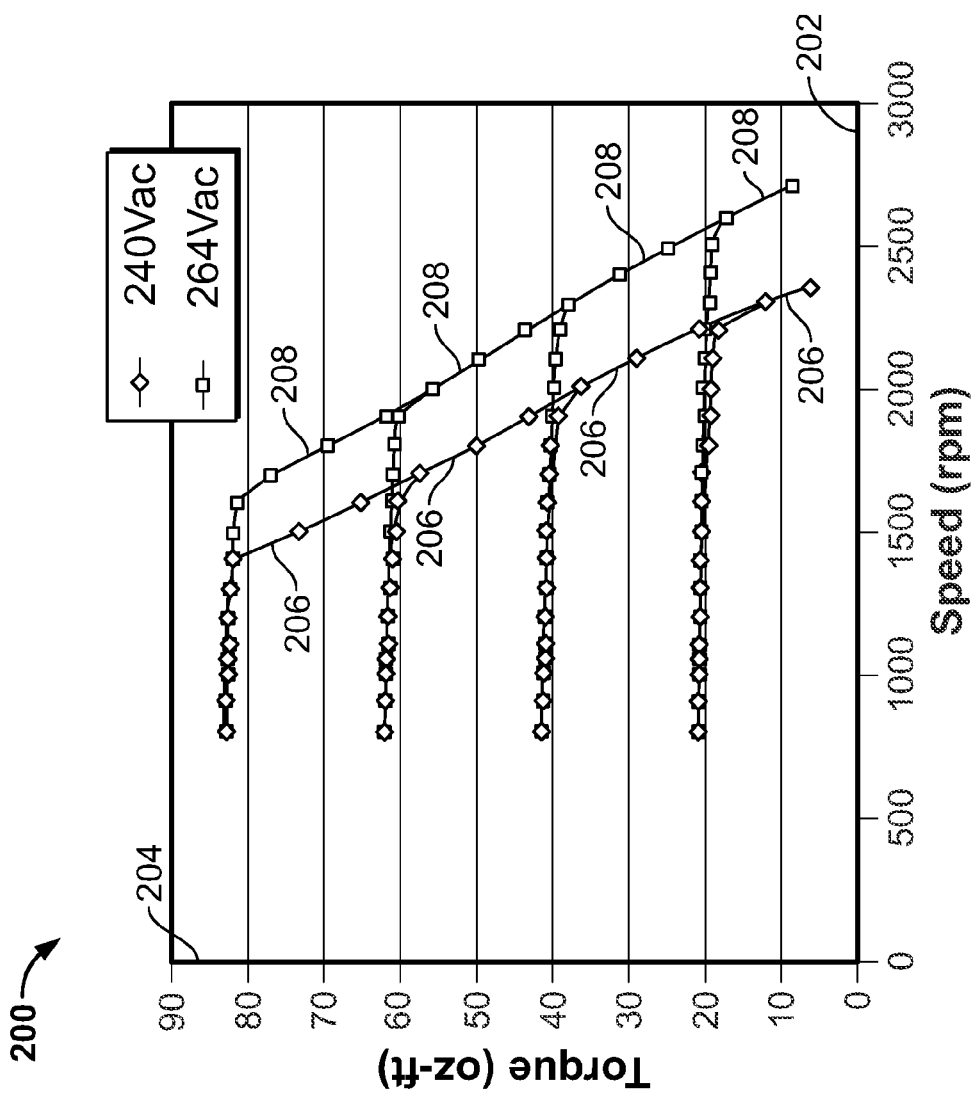

FIG. 2 is a graph 200 of a torque/speed curve for a motor assembly in accordance with an exemplary embodiment of the present disclosure. In the exemplary embodiment, graph 200 includes an x-axis 202 graduated in units of rotational speed expressed in rpm and a y-axis 204 graduated in units of torque expressed in oz.-ft. A first set 202 of traces represents the torque vs. speed characteristics of the motor running at approximately 240 volts AC. Graph 200 also includes a second set 208 of traces representing the torque vs. speed characteristics of a motor running at approximately 264 volts AC. In the exemplary embodiment, the motor assembly is configured to measure an input voltage and regulate an approximately constant motor phase current to achieve a desired torque profile.

Figure 3:
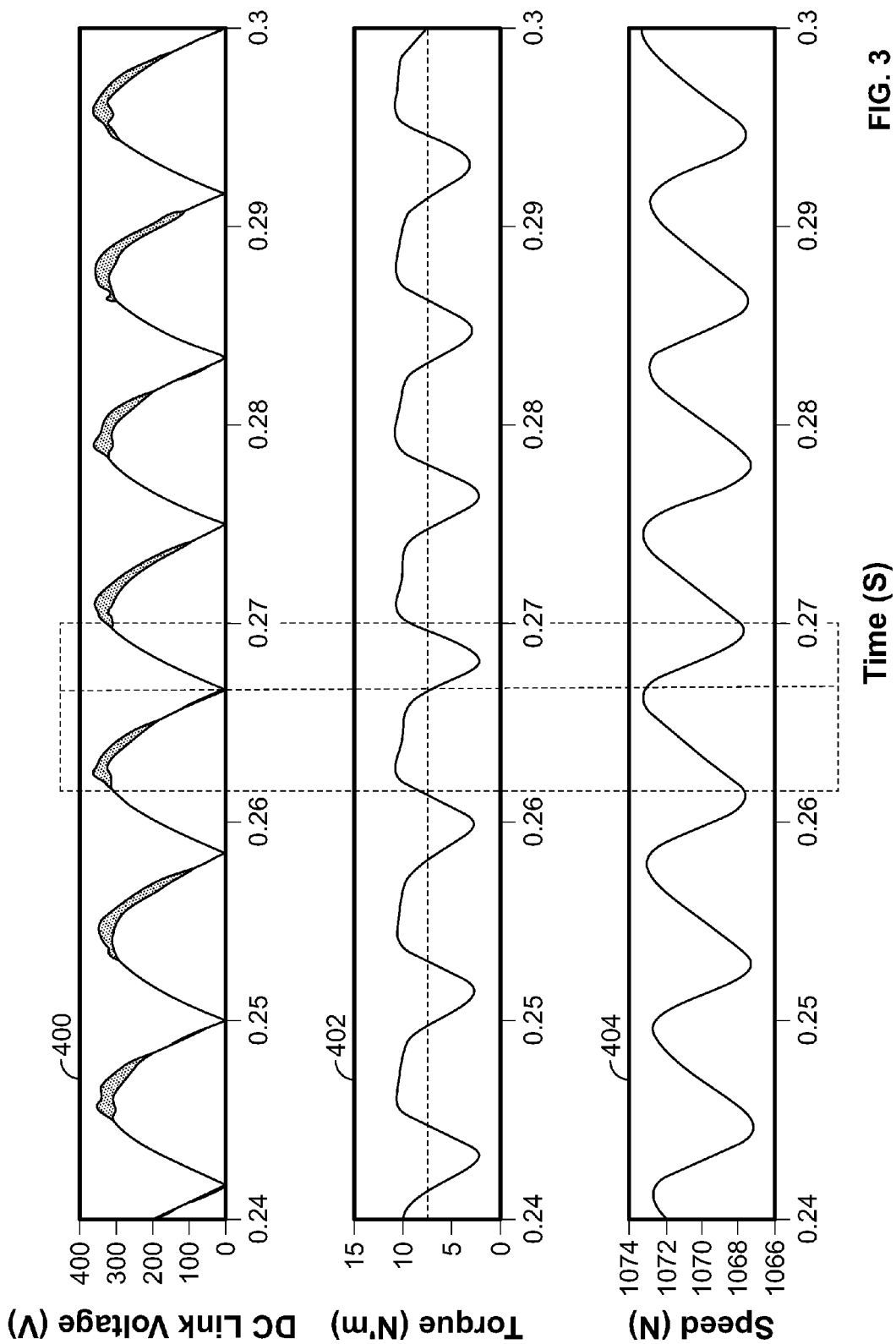

FIG. 3 illustrates that a typical control algorithm cannot regulate steady state torque in a low capacitance motor as in other drives associated with typical ECMs. Graph 400 of DC link voltage vs. time illustrates that the DC link voltage reaches zero periodically because the electrolytic capacitors are not present to supply energy to the system. Because the capacitors are not present, the torque and the speed vary according to the rectified sine wave on the bus voltage. Graph 402 illustrates that the torque is not constant and therefore the motor speed is also not constant.

Figure 4:
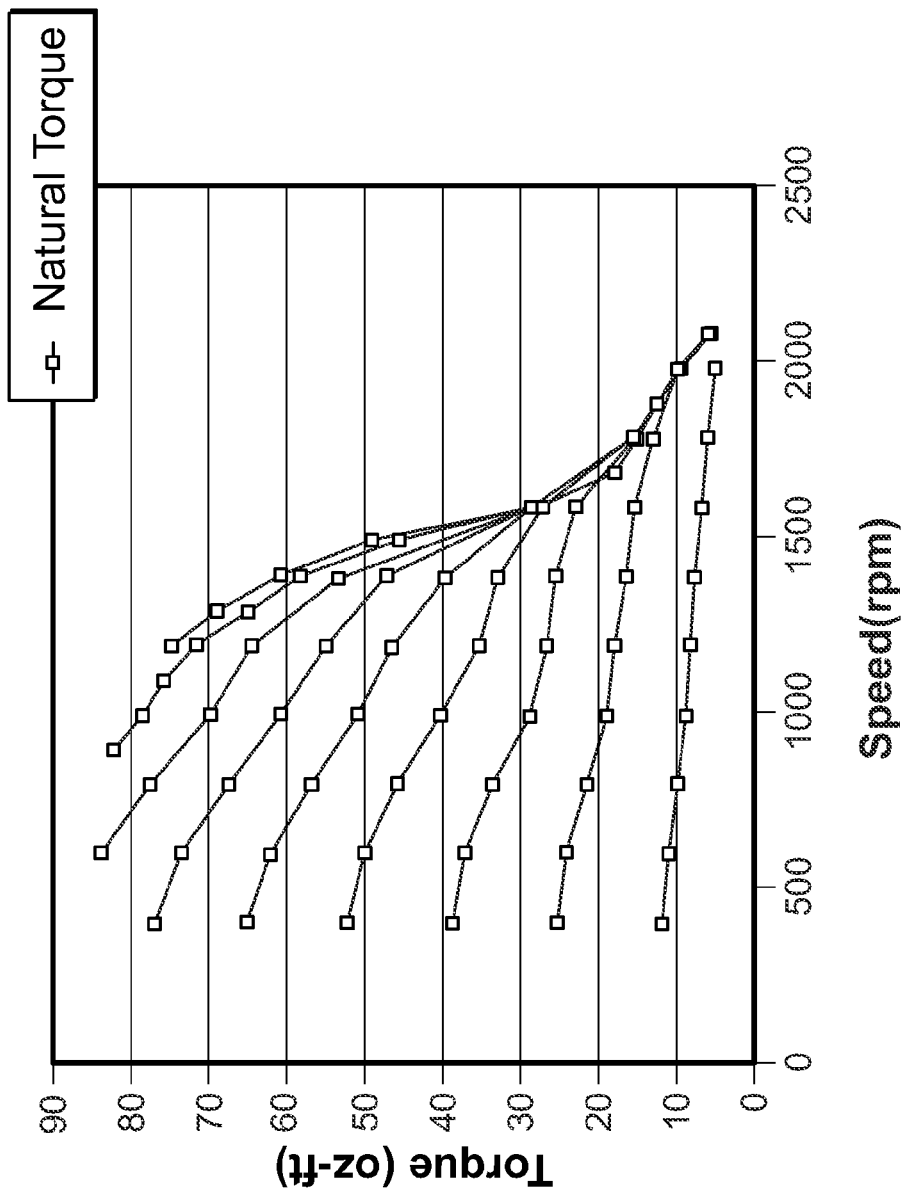

FIG. 4 is a graph 500 of a natural torque profile of a low capacitance-controlled motor. In the exemplary embodiment, the family of torque vs. speed curves do not have a linear segment, a knee, and a negative-slope portion as was seen in FIG. 2. Solutions for restoring the constant average torque characteristics of a low capacitance motor are shown below.

Figure 5:
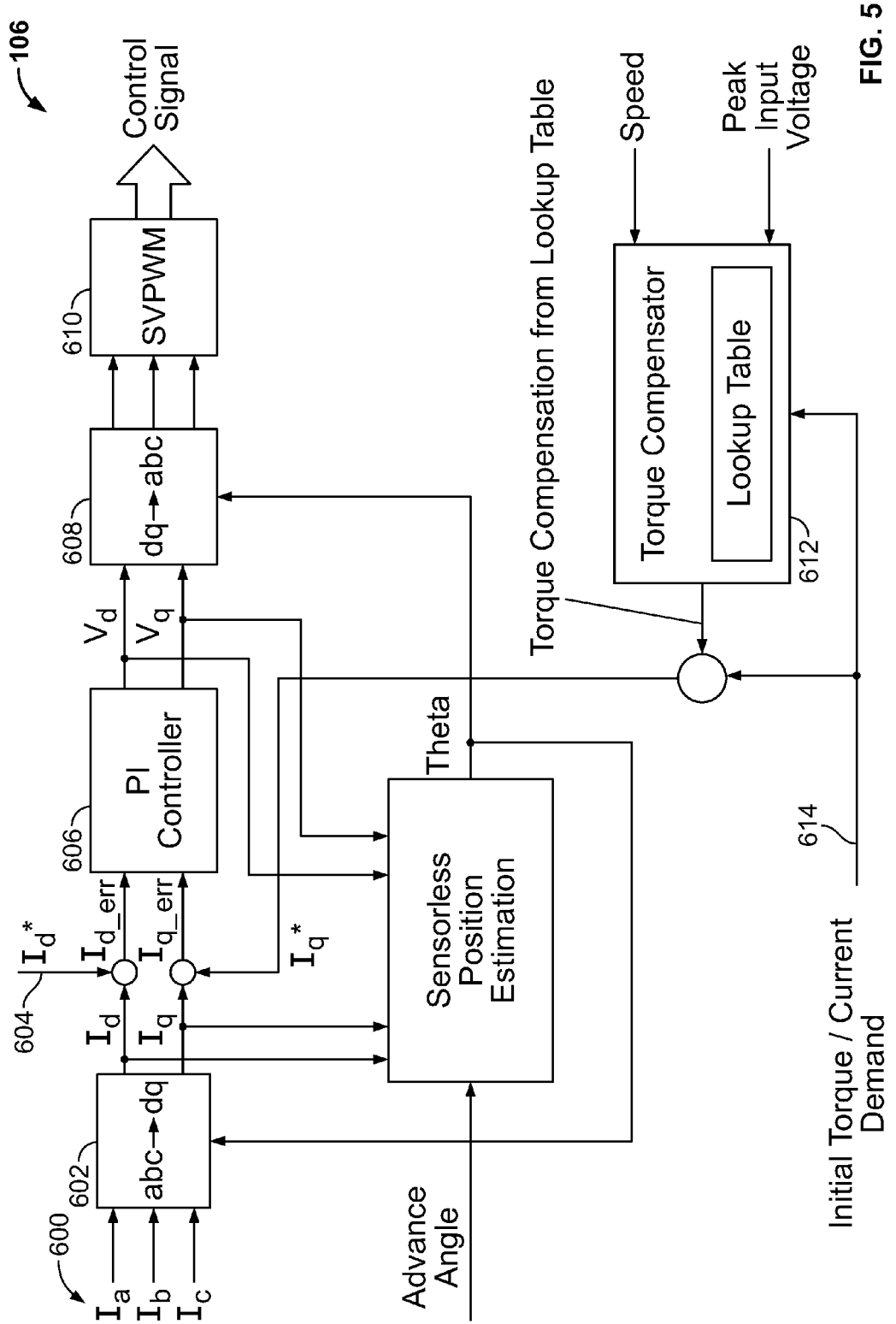

FIG. 5 is a block diagram of an exemplary algorithm implemented by controller 106 (shown in FIG. 1). Because motor drive controller 100 (shown in FIG. 1), does not include a capacitor having a relatively large capacitance value in the DC link circuit, the voltage of DC link 117 drops to zero each time the AC input voltage drops to approximately zero. Typically, when DC link voltage drops to zero, also referred to as a 100% voltage ripple, regeneration and braking occur in electric motor 102, which may cause undesired effects in electric motor 102, such as, for example, the motor does not operate with a constant average torque profile. In the exemplary embodiment, controller 106 is configured to control electric motor 102 (shown in FIG. 1) to produce constant average torque during operation even when input voltage is one of approaching zero and equal to zero. More specifically, in the exemplary embodiment, controller 106 is configured to control electric motor 102 to produce torque when DC link voltage has a 100% voltage ripple.

In the exemplary embodiment, controller 106 is coupled to rectifier 104 and to inverter 108 (both shown in FIG. 1). Controller 106 receives three-phase motor current measurements $I_a$, $I_b$, and $I_c$ from at least one current sensor 600, which is coupled to electric motor 102. Controller 106 includes a d-q conversion module 602, a current command generator 604, a PI controller 606, an a-b-c conversion module 608, a modulator 610, and a torque compensator 612.

Current measurements $I_a$, $I_b$, and $I_c$ are converted to a d-q reference frame by d-q conversion module 602 to obtain a d-axis current $I_d$, related to a flux linkage component of the current and a q-axis current $I_q$ related to a torque component of the current. $I_d$ and $I_q$ are sent to PI controller 606. Current command generator 604 generates a d-axis command $I_d^*$ and torque compensator 612 generates a q-axis command $I_q^*$ using a real time current demand signal 614. D-axis command $I_d^*$ and q-axis command $I_q^*$ are both also sent to PI controller 606.

In the exemplary embodiment, torque compensator 612 is based on a lookup table system to regulate constant average torque. The lookup table would be a function of the input voltage, the torque demand and the motor operating speed, in this case the lookup table is a three dimensional lookup table, however any number of dimensions may be used to accommodate additional or less parameters on which to base the constant average torque algorithm. In various embodiments, the lookup table is calculated offline taking into account the motor parameters such as resistance, inductance, back emf and torque constants. The speed used as an input to "read" the lookup table and can either be the transient speed or a filtered version of the speed that averages the system speed oscillations. To determine the voltage available, and because the DC link voltage could be oscillating between the peak full wave rectified voltage and zero, an algorithm tracks the peak of the DC bus voltage at one or more multiples of the period of the AC source signal. For example, in the US, for 60 Hz, the multiples of the voltage tracked would be within 30 Hz, 60 Hz, or 120 Hz for its maximum value. In an alternative embodiment, the AC voltage on the AC side of the drive is sensed and the tracking algorithm locates the peak value.

An example lookup table for a given input voltage may be given by:

| Peak Voltage = 240 Vrms = 340 Vdc | | | | | | | | | | | | | |
|---|---|---|---|---|---|---|---|---|---|---|---|---|---|
| Torque/ | Speed (RPM) | | | | | | | | | | | | |
| Current | 100 | 200 | 300 | 400 | 500 | 600 | 700 | 800 | 900 | 1000 | 1100 | 1200 | 1300 |
| 10% | 1% | 3% | 6% | 9% | 14% | 16% | 19% | 23% | 26% | 28% | 32% | 35% | 37% |
| 20% | 2% | 4% | 7% | 10% | 15% | 17% | 20% | 24% | 27% | 29% | 33% | 36% | 38% |
| 30% | 3% | 5% | 8% | 11% | 16% | 18% | 21% | 25% | 28% | 30% | 34% | 37% | 39% |
| 40% | 4% | 6% | 9% | 12% | 17% | 19% | 22% | 26% | 29% | 31% | 35% | 38% | 40% |
| 50% | 6% | 8% | 11% | 14% | 19% | 21% | 24% | 28% | 31% | 33% | 37% | 40% | 42% |
| 60% | 8% | 10% | 13% | 16% | 21% | 23% | 26% | 30% | 33% | 35% | 39% | 42% | 44% |
| 70% | 10% | 12% | 15% | 18% | 23% | 25% | 28% | 32% | 35% | 37% | 41% | 44% | 46% |
| 80% | 12% | 14% | 17% | 20% | 25% | 27% | 30% | 34% | 37% | 39% | 43% | 46% | 48% |
| 90% | 13% | 15% | 18% | 21% | 26% | 28% | 31% | 35% | 38% | 40% | 44% | 47% | 49% |
| 100% | 14% | 16% | 19% | 22% | 27% | 29% | 32% | 36% | 39% | 41% | 45% | 48% | 50% |

The lookup table may be generated offline or computed inside of a microcontroller by solving the circuit equations, however such an operation may be very complex and resource intensive. Moreover, controller 106 doesn't need a position sensor to track rotor position. The algorithm is also valid if the drive is getting the information on the rotor position from sensors. It is independent of the method used to acquire the rotor position.

PI controller 606 prepares voltage values $V_d$ and $V_q$ to be applied to electric motor 102 such that the d-axis current value $I_d$ and the q-axis current value $I_q$ are regulated to reach the d-axis current command $I_d^*$ and the q-axis current command $I_q^*$. $V_d$ and $V_q$ are converted back to a three-phase coordinate system by a-b-c conversion module 608, which provides the three-phase voltage values $V_a$, $V_b$, and $V_c$ to modulator 610. Modulator 610 outputs the voltage values $V_a$, $V_b$, and $V_c$ to inverter 108 as a pulse-width-modulated (PWM) signal. Modulator 116 outputs the PWM signal with a frequency, angle, and/or duty cycle to provide suitable power to electric motor 102.

In the exemplary embodiment, controller 106 is configured to control electric motor 102 to produce constant average torque during all operations of motor 102 and when input voltage is one of approaching zero and equal to zero. In controlling electric motor 102, controller 106 is configured to maintain torque of electric motor 102 constant when input voltage is zero. More specifically, in the exemplary embodiment, controller 106 is configured to control current flowing to electric motor 102 such that electric motor 102 produces torque when input voltage is one of approaching zero and equal to zero.

In one embodiment, to control current flowing to electric motor 102, controller 106 is configured to induce the flux linkage component $I_d$ of the current to maintain the torque component $I_q$ of the current above zero while reducing loss of energy stored in the stator windings of electric motor 102. In another embodiment, to control current flowing to electric motor 102, controller 106 is configured to induce the flux linkage component $I_d$ of the current to maintain the torque component $I_q$ of the current above zero while reducing torque ripple in electric motor 102. In yet another embodiment, to control current flowing to electric motor 102, controller 106 is configured to induce the flux linkage component $I_d$ of the current to maintain the torque component $I_q$ of the current above zero while manipulating torque harmonics to reduce audible noise in electric motor 102.

In the exemplary embodiment, controller 106 is implemented in one or more processing devices, such as a microcontroller, a microprocessor, a programmable gate array, a reduced instruction set circuit (RISC), an application specific integrated circuit (ASIC), etc. Accordingly, in this exemplary embodiment, d-q conversion module 602, current command generator 604, PI controller 606, a-b-c conversion module 608, modulator 610, and torque compensator 612 are constructed of software and/or firmware embedded in one or more processing devices. In this manner, controller 106 is programmable, such that instructions, intervals, thresholds, and/or ranges, etc. may be programmed for a particular electric motor 102 and/or operator of electric motor 102. One or more of d-q conversion module 602, current command generator 604, PI controller 606, a-b-c conversion module 608, modulator 610, and torque compensator 612 may be wholly or partially provided by discrete components, external to one or more processing devices.

Figure 6:
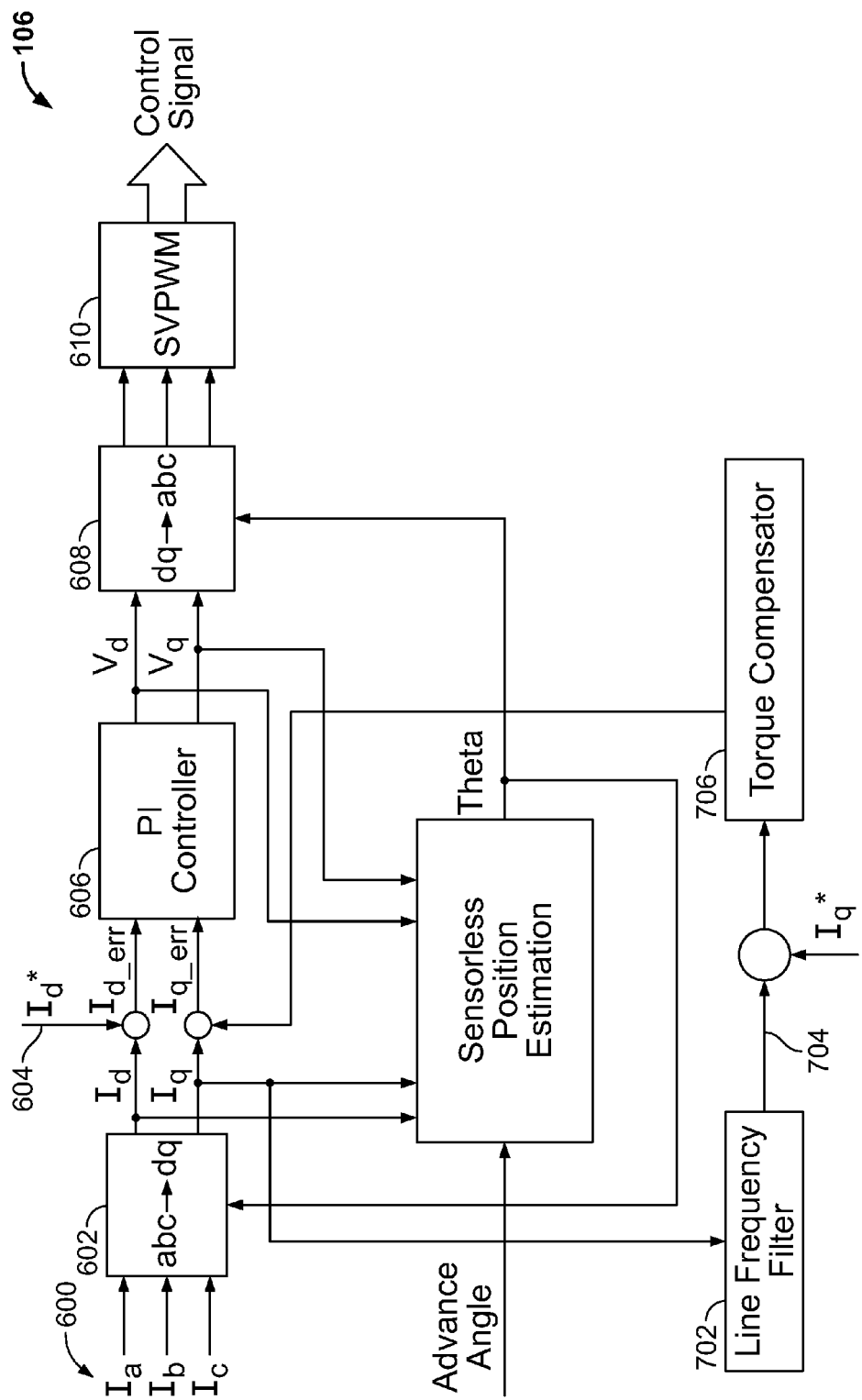

FIG. 6 is a block diagram of another exemplary algorithm implemented by controller 106 (shown in FIG. 1) to maintain a constant average torque output of electric motor 102 (also shown in FIG. 1). In this embodiment, instead of using torque compensator 612 that includes lookup tables, controller 106 includes a line frequency filter 702 to filter the $I_q$ signal, the resultant 704 of which is then combined with q-axis command $I_q$* and transmitted to real time torque compensator 706. The instantaneous torque is estimated through the measurement of the instantaneous motor current, which is filtered and which represents the reading of the average torque in electric motor 102. The external additional control loop including real time torque compensator 706 changes, in real time, the current demand appropriately to cause controller 106 to provide a constant average torque.

Figure 7:
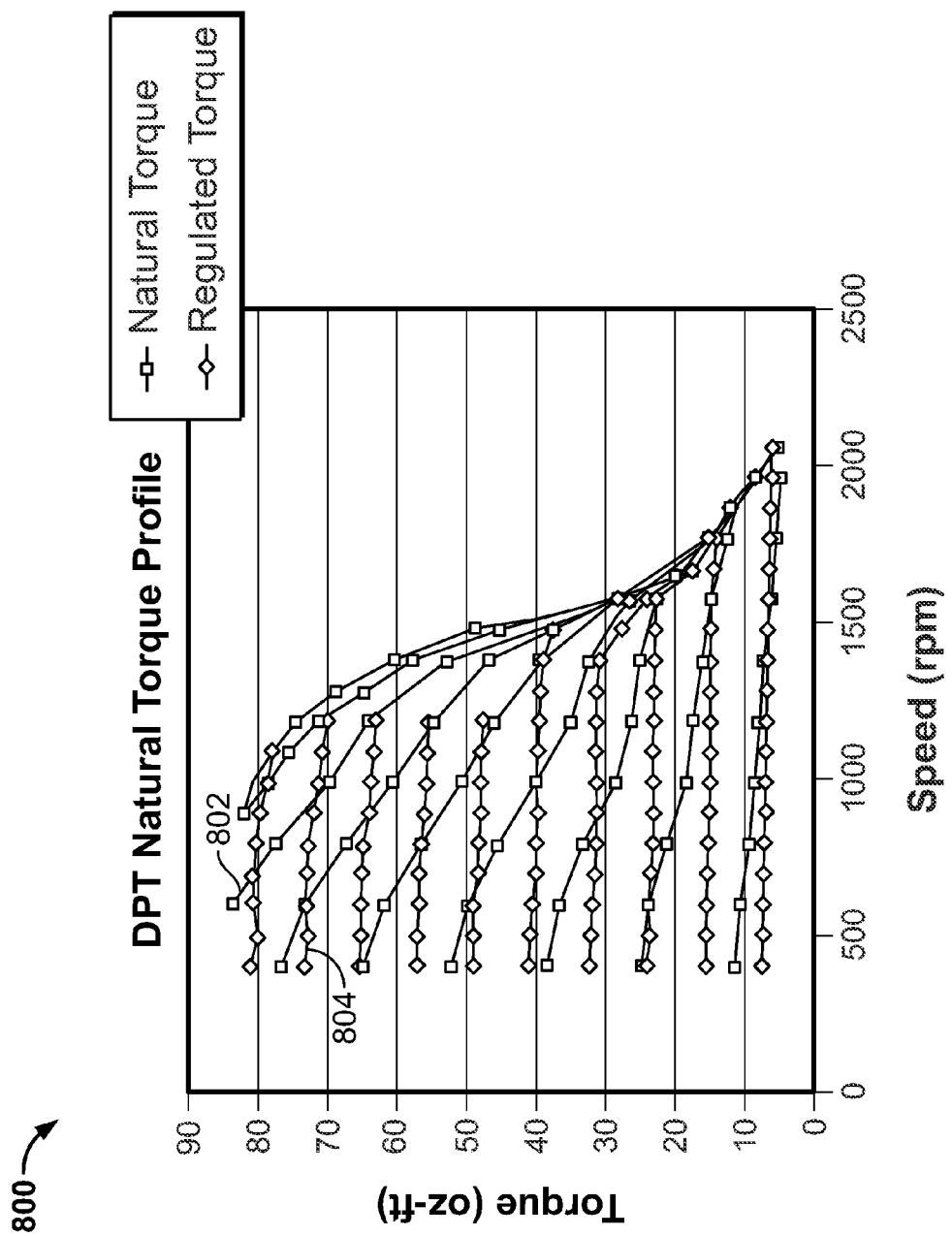

FIG. 7 is a graph 800 of the natural torque profile (squares) 802 of a low capacitance-controlled motor as shown in FIG. 5 overlain with a torque profile (diamonds) 804 of the low capacitance-controlled motor regulated using embodiments of the present invention. In the exemplary embodiment, the family of torque vs. speed curves representing the profile of the regulated motor are restored to approximately the profile of a controller that includes electrolytic capacitors. The present family of regulated torque vs. speed curves again include a linear segment, a knee, and a negative-slope portion as was shown in FIG. 2.

Figure 8:
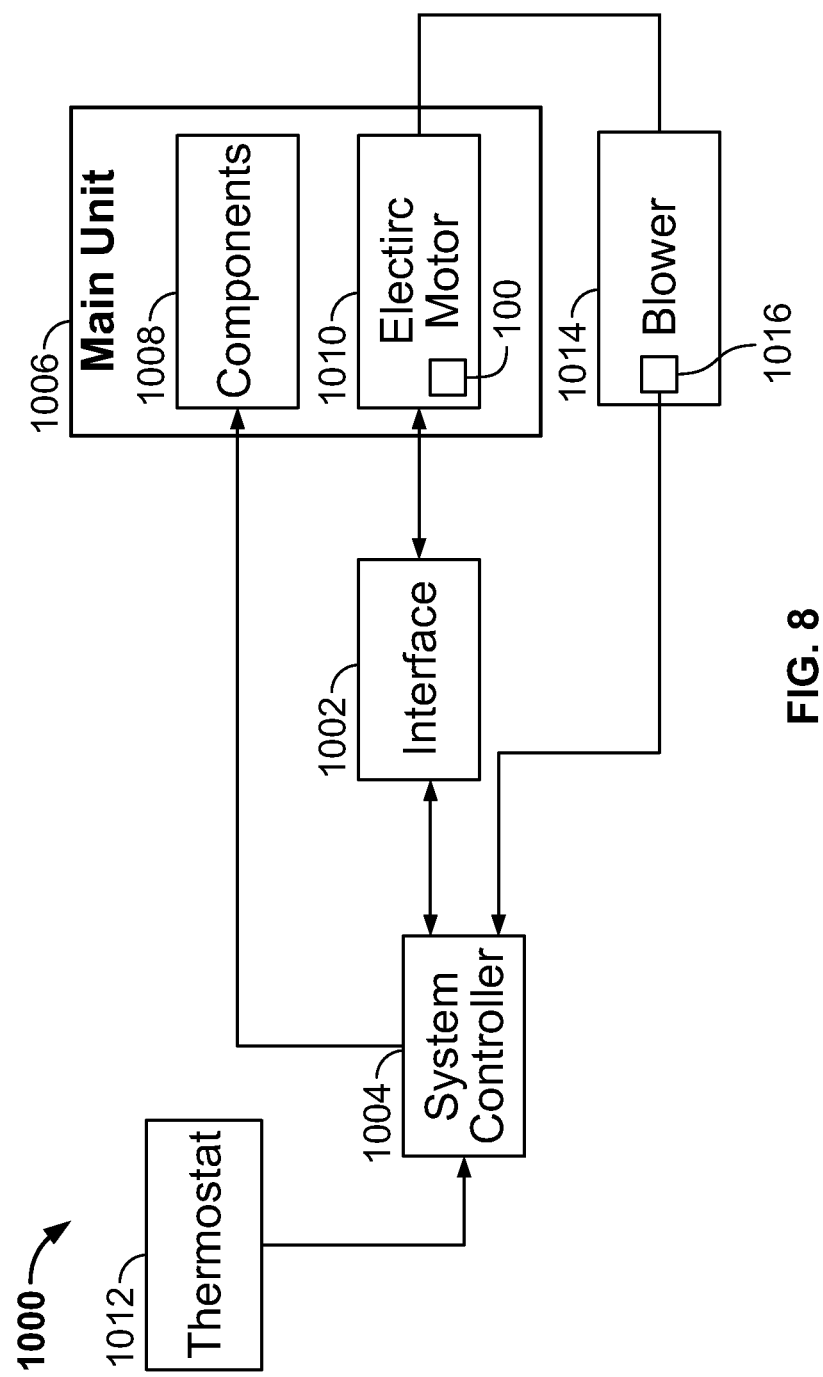

FIG. 8 is a block diagram of an exemplary embodiment of motor drive controller 100 shown in FIG. 1 in an air moving control system 1000. System 1000 is an air moving system, such as a residential heating, ventilation and air conditioning (HVAC) system, a light industrial HVAC system, or a clean room filtering system. While described herein as being used in an HVAC system, motor drive controller 100 may be used in other applications, including, but not limited to, swimming pool pumps, laundry machine motors, and gas pre-mix motors. System 1000 includes an interface circuit 1002 electrically coupled to a system controller 1004, for example a HVAC system controller, and a main unit 1006, for example a HVAC unit. Main unit 1006 includes components 1008 and electric motor 1010. In one embodiment, electric motor 1010 is a motor configured to rotate a blower. Electric motor 1010 includes motor drive controller 100 including a processing unit (shown in FIG. 1) and a memory (not shown) containing an electric motor drive program. In one embodiment, system controller 1004 is connected to a thermostat 1012. Thermostat 1012 includes a plurality of settings, or modes, such as low heat, high heat, cooling, dehumidify, and continuous fan. Additionally, thermostat 1012 measures a temperature in a predetermined space or location and transmits an electrical signal representing the measured temperature to system controller 1004.

System controller 1004 controls main unit 1006 via interface circuit 1002. Interface circuit 1002 receives control signals in the form of input voltage signals from system controller 1004 and translates the signals to signals suitable for controlling by electric motor 1010. Typically, circuits within system 1000 operate at a different voltage level than does electric motor 1010. Therefore interface circuit 1002 is utilized for communications between system controller 1004 and electric motor 1010. Such interfaces typically control electric motors using pulse width modulation (PWM) by continuously adjusting motor speed.

The translated signals are transmitted to motor drive controller 100 of electric motor 1010, and a torque of electric motor 1010 is varied in accordance with the adjusted voltage outputs. Electric motor 1010 is mechanically connected to a blower 1014. In one embodiment, blower 1014 includes a detection module 1016 which provides signals, for example signals indicative of a speed of rotation of blower 1014, to system controller 1004.

Figure 9:
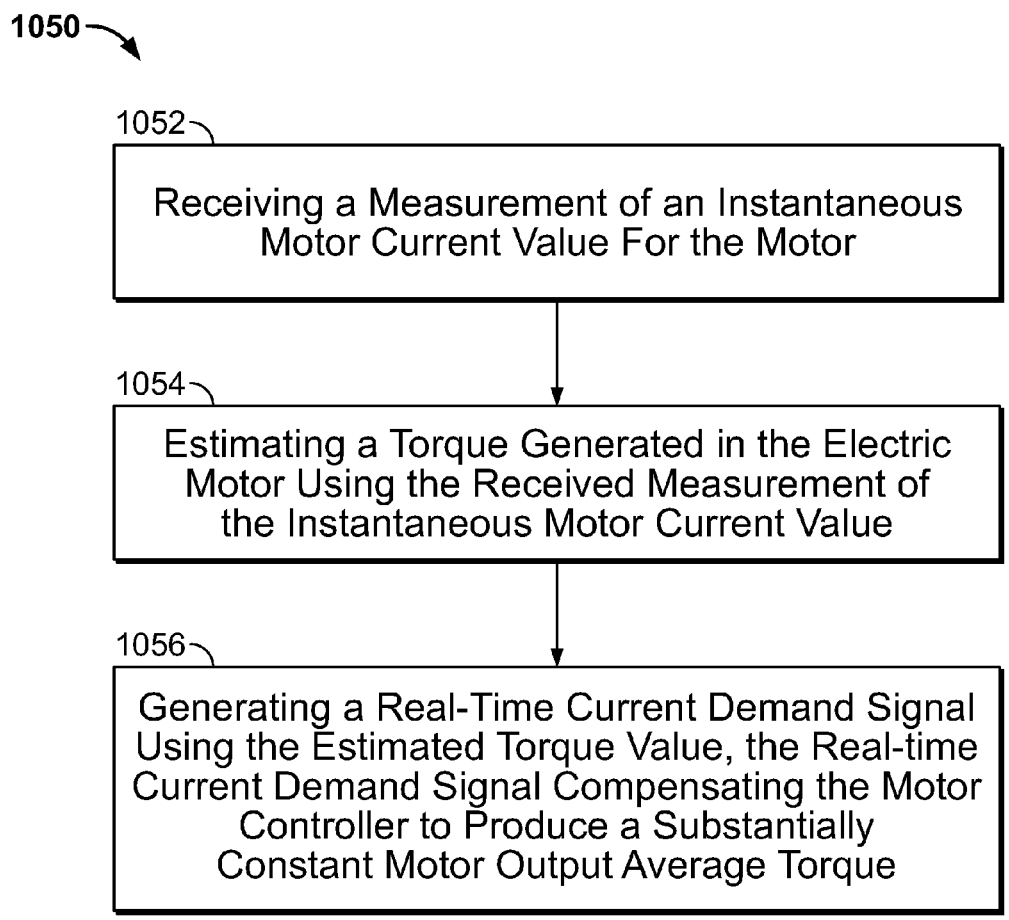

FIG. 9 is a flow chart 1050 of a method of operating an electric motor, such as electric motor 102 (shown in FIG. 1) using motor drive controller 100 (shown in FIG. 1). In the exemplary embodiment, electric motor 102 is coupled to a load 112 (shown in FIG. 1) and to a power supply, such as power supply 110 (shown in FIG. 1).

In the exemplary embodiment, motor drive controller 100 receives 1052 a measurement of an instantaneous motor current value in electric motor 102. The amount of current is measured by at least one current sensor 200 (shown in FIG. 2) coupled to electric motor 102 and to motor drive controller 100.

In the exemplary embodiment, motor drive controller 100 then controls current flowing to electric motor 102 such that electric motor 102 produces approximately constant average torque throughout a range of operation of electric motor 102.

In one embodiment, to control current flowing to electric motor 102, controller 106 estimates 1054 a torque generated in the electric motor using the received measurement of the instantaneous motor current value and generates 1056 a real-time current demand signal using the estimated torque value. The real-time current demand signal compensates the motor controller to produce a substantially constant average motor output torque.

In one embodiment, a lookup table of motor speed versus motor torque is used to compensate the current demand signal. In various embodiments, a measurement of motor current is used to estimate the motor torque. The current demand signal is compensated using the estimated torque value to maintain the motor torque average approximately constant over an operating range of the motor.

The described embodiments provide a cost savings to the manufacturer and ultimately to the consumer as electrolytic filter capacitors are eliminated from a motor controller of an electric motor. Additionally, reliability of such systems increases as there are fewer components within the system. Moreover, the described embodiments tend to maintain an approximately constant average torque of the electric motor in which they are installed.

A technical effect of the methods and systems described herein may include one or more of: (a) receiving a measurement of an instantaneous motor current value for the motor, (b) estimating a torque generated in the electric motor using the received measurement of the instantaneous motor current value, and (c) generating a real-time current demand signal using the estimated torque value, the real-time current demand signal compensating the motor controller to produce a substantially constant average motor output torque.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An electric motor drive controller configured to be coupled to an electric motor, said drive controller configured to control the electric motor to produce approximately constant average torque, said drive controller comprising:
   a rectifier configured to convert an AC input voltage to a pulsing DC voltage;
   a DC link electrically coupled to the rectifier;
   an inverter electrically coupled to the DC link and configured to generate a three phase AC voltage to drive the electric motor; and
   a controller configured to:
      receive a measurement of an instantaneous motor current value for the motor;
      estimate a torque generated in the electric motor using the received measurement of the instantaneous motor current value; and
      generate a real-time current demand signal using the estimated torque value, the real-time current demand signal compensating the motor controller to produce a substantially constant average motor output torque.

2. The electric motor drive controller of claim 1, further comprising a torque compensator configured to estimate instantaneous motor torque using a measurement of instantaneous motor current and modify a real time current demand that compensates the motor controller to produce a substantially constant motor output average torque using relatively low capacitance capacitors in the DC link circuit of the motor controller.

3. The electric motor drive controller of claim 1, further comprising a filter configured to filter the instantaneous motor current value to provide an average current value for the motor.

4. The electric motor drive controller of claim 1, further comprising a torque compensator comprising a lookup table that relates at least two of motor speed, motor torque, and input voltage.

5. The electric motor drive controller of claim 4, wherein said torque compensator is configured to generate a real-time current demand signal using the lookup table.

6. The electric motor drive controller of claim 4, wherein said torque compensator is configured to receive at least one of a motor speed signal and a peak input voltage signal.

7. The electric motor drive controller of claim 1, further configured to produce a substantially constant motor output average torque using relatively low capacitance non-electrolytic capacitors in a DC link circuit of the motor controller.

8. A method of controlling an electric motor using a motor controller, the electric motor configured to be coupled to a power supply and to a load, said method comprising:
   receiving a measurement of an instantaneous motor current value for the motor;
   estimating a torque generated in the electric motor using the received measurement of the instantaneous motor current value; and
   generating a real-time current demand signal using the estimated torque value, the real-time current demand signal compensating the motor controller to produce a substantially constant average motor output torque.

9. The method of claim 8, further comprising filtering the instantaneous motor current value.

10. The method of claim 9, further comprising determining an average torque generated by the electric motor using the filtered instantaneous motor current value.

11. The method of claim 8, wherein generating a real-time current demand signal comprises generating the real-time current demand signal using a lookup table that relates at least two of motor speed, motor torque, and input voltage.

12. The method of claim 8, wherein generating a real-time current demand signal comprises generating the real-time current demand signal using a lookup table that relates at least two of motor speed, motor torque, and input voltage to generate the real-time current demand signal.

13. The method of claim 12, wherein generating the real-time current demand signal comprises receiving at least one of a motor speed signal and a peak input voltage signal.

14. The method of claim 8, wherein compensating the motor controller to produce a substantially constant average motor output torque comprises compensating the motor controller to produce a substantially constant average motor output torque without using capacitors in a DC link circuit of the motor controller.

15. An air moving system comprising:
   an electric motor;
   a load coupled to said electric motor; and
   a controller coupled to said electric motor, said controller configured to:
      receive a measurement of an instantaneous motor current value for the motor;
      estimate a torque generated in the electric motor using the received measurement of the instantaneous motor current value; and
      generate a real-time current demand signal using the estimated torque value, the real-time current demand signal compensating the motor controller to produce a substantially constant average motor output torque.

16. The system of claim 15, wherein said controller is further configured to estimate instantaneous motor torque using a measurement of instantaneous motor current.

17. The system of claim 15, wherein said controller is further configured to modify a real time current demand using the estimate, the real time current demand is modified such that the controller produces a substantially constant average motor output torque without using capacitors in the DC link circuit of the motor controller.

18. The system of claim 15, wherein said controller is further configured to filter the instantaneous motor current value to generate an average torque generated by the electric motor.

19. The system of claim 15, wherein said controller is further configured to generate the real-time current demand signal using a lookup table that relates motor speed to motor torque.

20. The system of claim 15, wherein said controller is further configured to receive at least one of a motor speed signal and a peak input voltage signal.

* * * * *